United States Patent [19]

Hart et al.

[11] 4,230,341

[45] Oct. 28, 1980

[54] VEHICLE SUSPENSION SYSTEM

[75] Inventors: Cullen P. Hart; Thomas C. Meisel, Jr., both of Peoria, Ill.

[73] Assignee: Caterpillar Tractor Co., Peoria, Ill.

[21] Appl. No.: 945,270

[22] Filed: Sep. 25, 1978

[51] Int. Cl.³ .................................................. B60G 17/04
[52] U.S. Cl. ............................................................ 280/702
[58] Field of Search ................................... 280/702–714

[56] References Cited

U.S. PATENT DOCUMENTS

| | | | |
|---|---|---|---|
| 3,610,646 | 10/1971 | Bobard et al. | 280/709 X |
| 3,653,613 | 4/1972 | Palmer et al. | 280/713 X |
| 3,659,870 | 5/1972 | Okuyama | 280/713 |
| 3,689,103 | 9/1972 | Meulendyk | 280/710 |
| 3,923,240 | 12/1975 | Glaze | 280/709 X |
| 3,953,040 | 4/1976 | Unruh et al. | 280/709 X |
| 3,970,327 | 7/1976 | Dezelan | 280/709 X |

Primary Examiner—John J. Love
Assistant Examiner—Norman L. Stack
Attorney, Agent, or Firm—Ralph E. Walters

[57] ABSTRACT

A vehicle suspension system is provided for a vehicle (10) which has a frame (12) and a plurality of ground engaging wheels (18,20,22,24). The suspension system (26) includes apparatus (26) for connecting the wheels (18,20,22,24) to the frame (12) and maintaining the frame (12) at a preselected elevation. The frame (12) moves elevationally less than one-half the height of an obstacle during movement of one of the wheels (18,20,22,24) over the obstacle.

5 Claims, 3 Drawing Figures

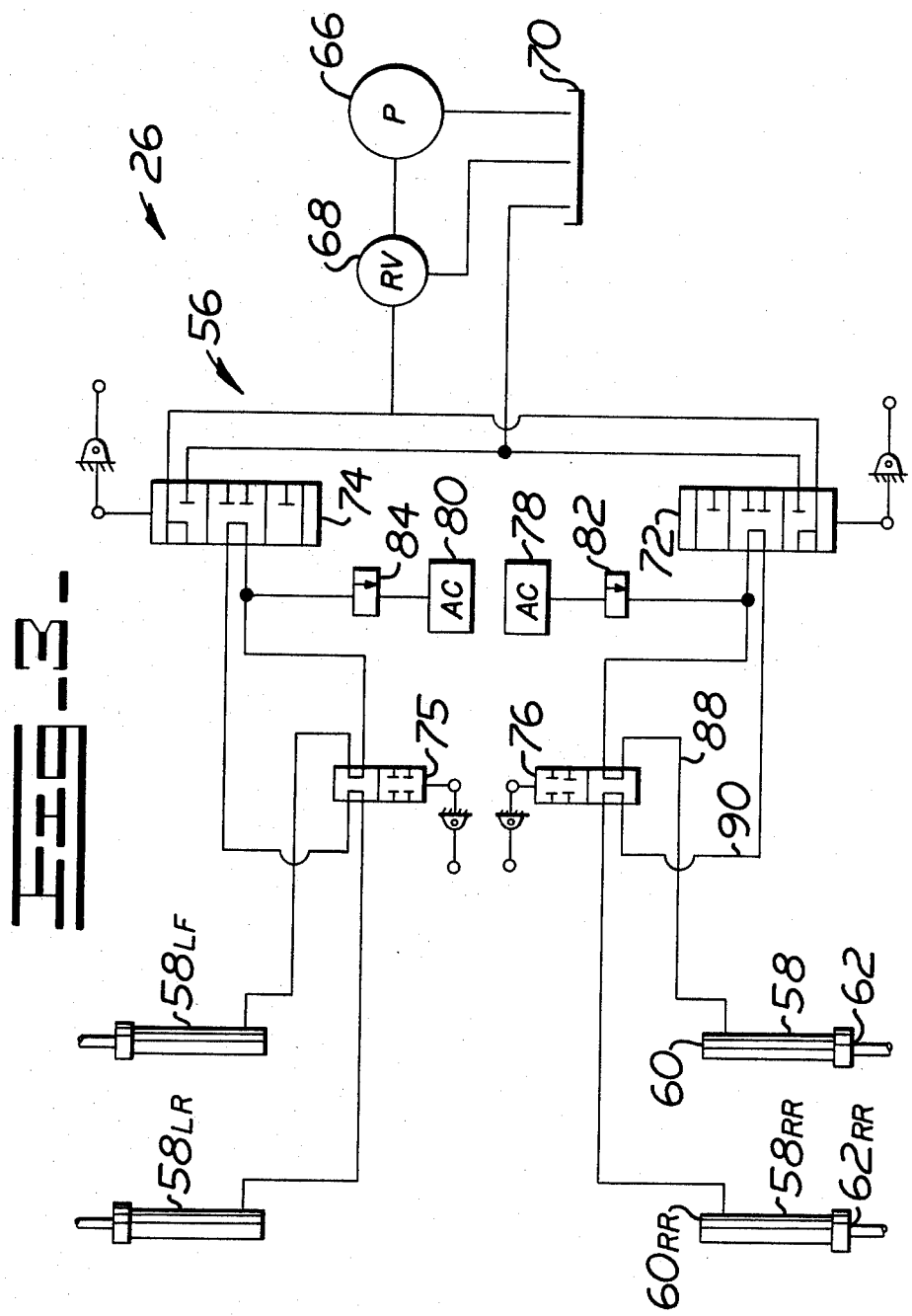

VEHICLE SUSPENSION SYSTEM

TECHNICAL FIELD

This invention relates to wheeled vehicles and more particularly to a tandem axle or dual wheel suspension assembly for such vehicles.

BACKGROUND ART

One of the problems in the operation of a vehicle, particularly a heavy duty vehicle such as a motor grader, is the effect of terrain irregularities on the attitude of the vehicle and its associated adjustably connected ground engaging tools. In the past, an operator had to change the adjustment of the ground engaging tool for each roll or pitch of the vehicle; i.e., those movements not otherwise corrected by the vehicle suspension system. Some vehicle reactions to road obstacles and terrain irregularities were so severe that available ground engaging tool adjustments were undesirably untimely for adequate adjustment of the tool and efficient operation.

Suspension designers attempted to overcome this problem by employing two axles on each machine side which oscillated about a center pivoted connecting arm. This arrangement provided for a machine displacement of one-half the size of a ground surface irregularity. A performance difficulty with the above oscillating arrangement occurs during braking or high torque acceleration modes, where the braking or final drive reaction torque is on the connecting arm, the oscillating connecting arm has an undesirable tumbling force about its axis which causes excessive loading on one of a set of tandem wheels. This decreases the effectiveness of the braking action, causes uneven tire wear and imposes excessive loads on the tires.

U.S. Pat. No. 3,953,040 which issued on Apr. 27, 1976 to Dale H. Unruh and Jan B. Yates discloses a cushioning, leveling and lockup system for a suspended axle vehicle which provides for continuous load leveling and selective cushioning of road shocks. A leveling control subsystem automatically corrects any changes in the distance between the vehicle frame and axle by communicating pressurized fluid to reposition suspension cylinder struts. This system, however, repositions the load only after a preselected amount of movement of the frame relative to the axle so that transverse frame displacement is independent of the obstacle encountered. Thus, for small obstacles and ground irregularities, the frame does not level itself.

U.S. Pat. No. 3,970,327 which issued on July 20, 1976 to Joseph E. Dezelan discloses a tandem axle suspension assembly for a vehicle. This suspension system improves upon the suspension system of Unruh and Yates in that the frame is leveled for any size obstacle or ground irregularity. However, in this tandem axle suspension assembly, the frame is always displaced a distance equal to one-half the size of the obstacle or irregularity.

It is therefore desirable to have a suspension system in which the vehicle frame always moves elevationally less than one-half the height of an obstacle during movement of one of the vehicle wheels over the obstacle to thereby provide greater stability.

DISCLOSURE OF INVENTION

In one aspect of the present invention, a vehicle suspension system is provided for a vehicle which has a frame and a plurality of ground engaging wheels. The suspension comprises means for connecting the wheels to the frame and maintaining the frame at a preselected elevation, said frame providing elevationally less than one-half the height of an obstacle during movement of one of the wheels over the obstacle.

BRIEF DESCRIPTION OF DRAWINGS

FIG. 3 is a schematic diagram of an embodiment of a fluid control means of a vehicle suspension system.

BEST MODE FOR CARRYING OUT THE INVENTION

Figure 1:
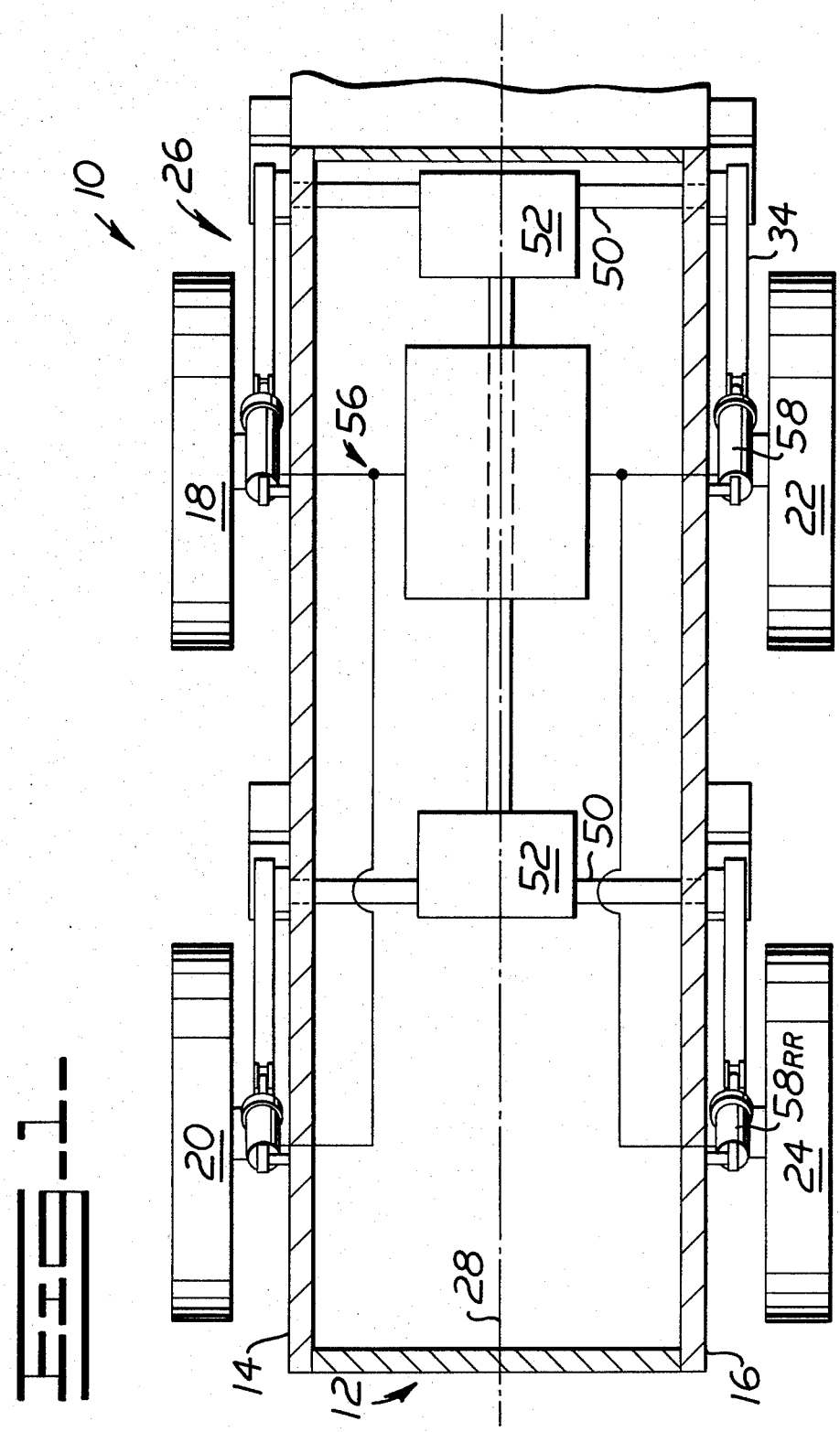
FIG. 1 is a diagrammatic top view of a portion of a vehicle suspension system illustrating an embodiment of the present invention.

Referring to FIG. 1, a vehicle, such as a motor grader 10, has a frame 12 with left and right side members 14,16. The left side member 14 has front and rear wheels 18,20 connected to it and the right side member 16 has front and rear wheels 22,24 connected to it. The frame 12 also has other wheels connected thereto as necessary for effective operation of the vehicle 10.

Figure 2:
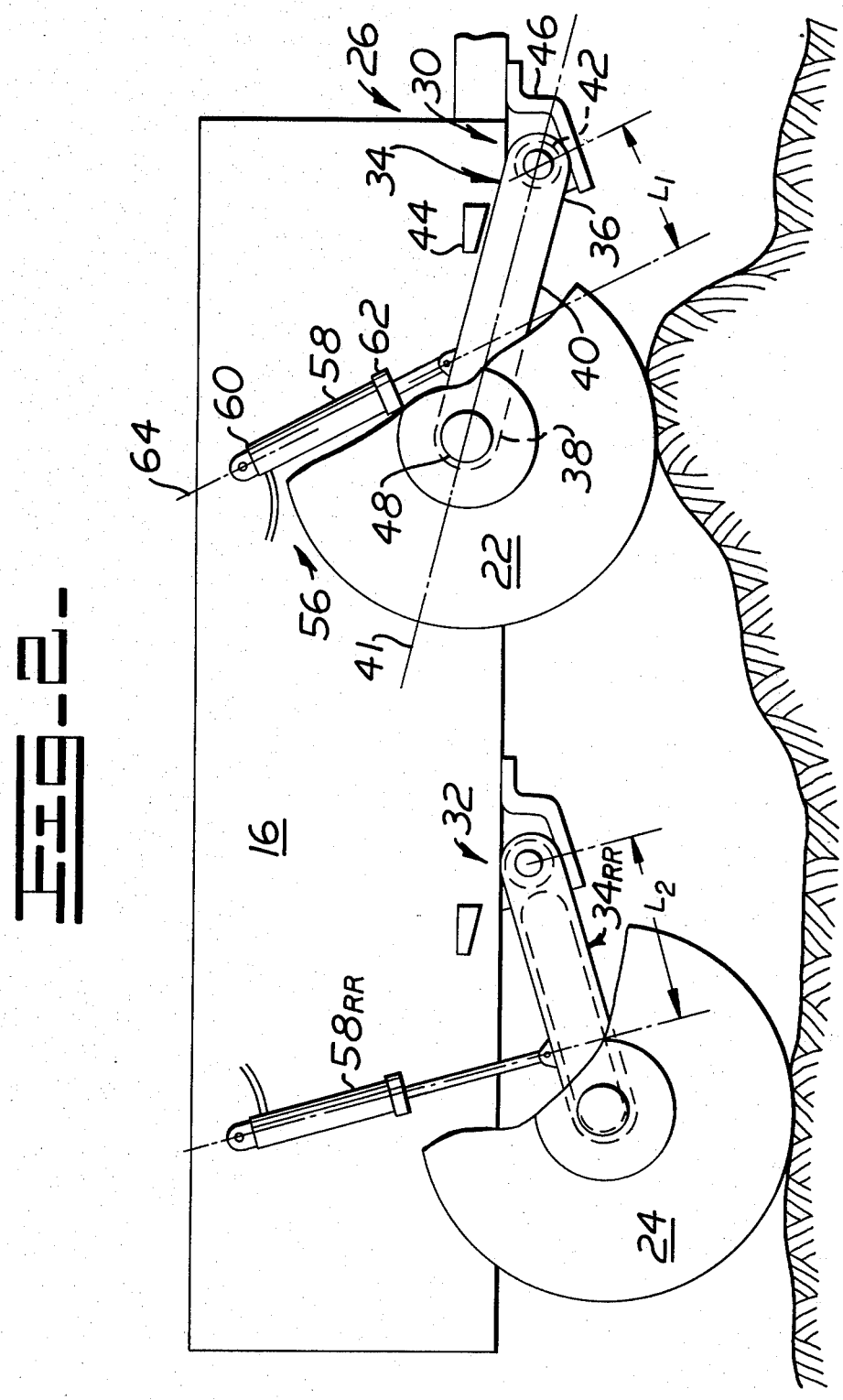
FIG. 2 is a diagrammatic side view of the vehicle suspension system engaging a road obstacle.

Referring to FIGS. 1–3, means 26 are provided for connecting the wheels 18,20,22,24 to the frame 12 and maintaining the frame 12 at a preselected elevation so that the frame 12 moves elevationally less than one-half the height of an obstacle or ground irregularity during movement of one of the wheels over the obstacle or irregularity. The structure connecting the left wheels 18 and 20 to the left frame member 14 is substantially identical to the structure connecting the right wheels 22 and 24 to the right frame member 16 and the left portion of the vehicle is substantially symmetrical about a longitudinal axis 28 of the vehicle 10 to the right vehicle portion. The following description focuses on the right vehicle portion for simplicity, but is equally applicable to the corresponding structure of the left vehicle portion.

Referring to FIG. 2, the connecting means 26 connects the right wheels 22,24 to a lower portion of the right frame member 16. The connecting means 26 includes pivot means 30,32 for individually, pivotally mounting each wheel 22,24 on the frame member 16. The pivot means 30 includes a lever arm 34 which has first and second end portions 36,38, a middle portion 40, and a longitudinal axis 41. The lever arm 34 is connected to the frame member 16 at its first end portion by a conventional pivotal bearing 42 and connected to the wheel 22 at its second end portion 38.

The lever arm 34 is limited in its upward and downward movement by stop means such as upper and lower stop members 44 and 46.

The wheel 22 is driven through an inner portion 48 of the lever arm 34 by commonly known axles 50 and speed differentials 52.

Referring to FIGS. 1–3, the connecting means 26 also includes fluid control means 56 associated with each of the wheels 18,20,22,24 for proportionately increasing the supporting force exerted on the frame 12 by each wheel in response to increasing downward movement of the wheel from a preselected location and proportionately decreasing the supporting force exerted on the frame 12 by each wheel in response to increasing upward movement of the wheel from the preselected location.

Referring to FIG. 2, the fluid control means 56 for the right front wheel 22 includes a cylinder 58 having first and second end portions 60,62 and a longitudinal axis 64. The second end portion 62 is pivotally connected to the lever arm 34. The first end portion 60 is pivotally connected to the frame member 16 at a location sufficient for angularly orienting the cylinder axis 64 from the vertical. This orientation of the cylinder axis 64 reduces the ratio between cylinder displacement and wheel displacement proportionately as the wheel 50 is raised above the level vehicle position and increases the ratio as the wheel 50 is lowered below the level vehicle position.

The second end 62 of the cylinder 58 can be connected to the lever arm 34 at a location between the wheel 22 and pivotal connection of lever arm 34 and frame 16 or at a location which places the wheel 22 between the second end 62 of the cylinder 58 and pivotal connection of lever arm 34 and frame 16. The cylinder 58 can have its second end 62 connected to the axle 50 or connected to the lever arm 34 at a location coincident with or adjacent the wheel 22. Wherever the second end 62 is connected, the cylinder 58 is oriented at an angle from the vertical to reduce displacement.

The fluid control means 56 interconnects the cylinder 58 associated with each of the wheels 18,20,22,24, as will be more fully explained below, so that extending or retracting of the right front cylinder a preselected amount causes the right rear cylinder to retract or extend a preselected amount and vice-versa, thereby repositioning the wheels.

Referring to FIG. 3, the fluid control means 56 interconnects the right front cylinder 58, right rear cylinder 58RR and the left front and rear cylinders 58LF and 58LR with each other and with a fluid pressure source 66. The fluid source 66 has the usual relief valve 68 and sump means 70. First and second selector valves 72,74 selectively control fluid between the fluid source 66 and the fluid cylinders 58,58RR and 58LF,58RF, respectively.

Each of the selector valves 72,74 is similar in construction and operation so that only one, (valve 72), as associated with its respective cylinders 58 and 58RR and a two-position blocking valve 76 need be described herein.

Selector valve 72 has three controllable positions: a stop position which blocks fluid flow between the relief valve 68 of the fluid source 66 and the fluid cylinders 58 and 58RR and reservoir 70; a charge position which communicates fluid between the fluid source 66 and the fluid cylinders 58 and 58RR; and a drain position which drains fluid from the cylinder 58 and 58RR. The controllable blocking valve 76 is positioned at a location between the cylinders 58 and 58RR sufficient for blocking fluid between the cylinders 58 and 58RR when in a first position and communicates fluid between the cylinders 58 and 58RR when in a second position.

A first accumulator 78 is in fluid communication with the first selector valve 72 and the cylinders 58,58RR. A second accumulator 80 is similarly in communication with the second selector valve 74 and the cylinders 58LF, 58LR. First and second accumulator stop valves 82,84 are positioned in locations and of constructions sufficient for opening or closing the respective accumulator 78 or 80 for communication with its respective fluid cylinders 58,58RR or fluid cylinders 58LF,58LR.

INDUSTRIAL APPLICABILITY

In one industrial application, the motor grader 10 performs on uneven terrain in a traveling mode as follows:

With selector valves 72,74 and blocking valves 75,76 positioned, as shown, the right front wheel 22 moves upwardly as it encounters a terrain obstacle. The upward movement causes the lever arm 34 to rotate about its pivotal bearing 42, and compresses the cylinder 58 while angularly orienting the axis 64 of cylinder 58 in a direction towards its respective axle 50, and decreases its lever movement $L_1$. As the cylinder 58 retracts, fluid is discharged from its head end 60 to pressurize the head end 60RR of cylinder 58RR via conduits 88,90 and open blocking valve 76. Cylinder 58RR is thereby extended and its associated lever movement $L_2$ is increased. The ascent of lever arm 34 and the descent of lever arm 34RR imposes a greater part of the frame load on the lever arm 34RR and its associated wheel 24 (the wheel on the right side 16 with the most favorable terrain), while depositing frame load on the lever arm 34 and its associated wheel 22 (the wheel on the right side 16 with the least favorable terrain).

Assuming relatively level terrain on all other vehicle wheels 18,20, the fluid pressure reaction to the above movements tends to hold the entire vehicle frame 12, stable. The vehicle wheels oscillate upwardly and downwardly relative to the vehicle frame to provide a frame leveling function during a traveling and/or earthmoving operation. Including the maximum, opposite oscillation of lever arms 34 and 34RR for a given obstacle, there is an upward displacement of frame 12, equaling substantially less than one-half the height of the obstacle, which tends to distribute the vehicle weight equally between the wheels 18,20,22 and 24 thereby eliminating the tendency for the wheels to tumble about the axles 50 while in a high brake torque mode.

In usual operating conditions, if an operator desires to increase vehicle ground clearance, he can place selector valves 72,74 in their charge position. The resulting equal lever arm movement away from the frame 12, raises the vehicle relative to the wheels and ground.

In the event an operator wants to lower his vehicle, he can place selector valves 72,74 in their drain position. The resulting equal lever arm movement towards the frame 12, lowers the vehicle relative to the ground.

If an operator engages in an operation which causes his vehicle to lean towards the right side 16, he can move the selector valve 72 to its drain position which will permit escape of fluid from cylinders 58LF and 58LR and lower the left side 14 for leveling of the vehicle frame 12. It is easily seen that an opposite frame leaning condition may be corrected by oppositely controlling the selector valves 72 and 74.

There are some load hauling operations which require a cushioned suspension, especially in a higher vehicle speed range under heavy loading. An operator can open shut-off means 82,84 and communicate accumulators 78,80 to the fluid control means 56 to provide a road-shock absorbing function in the suspension. Contrarywise, there are earth engaging operations which require a rigid suspension, such as in slow grading. An operator can close off the shut-off means 82,84 and remove the cushion effect of the accumulators 78,80.

Other aspects, objects and advantages of this invention can be obtained from a study of the drawings, the disclosure and the appended claims.

What is claimed is:

1. A suspension system for a vehicle (10) having front (18,22) and rear (20,24) ground engaging wheels, comprising:
a frame (12) having a left member (14) with front and rear axle openings therein and a right member (16) with front and rear axle openings therein;
a front axle (50) extending between the left and right frame members (14,16) with its end portions protruding through the front axle openings;
a rear axle (50) extending between the left and right frame members (14,16) with its end portions protruding through the rear axle openings;
a speed differential (52) drivingly connected to the axles (50);
pivot means (30) for individually, pivotally mounting each of said wheels (18,20,22,24), said pivot means (30) including a plurality of pivotal bearings (42); and
a plurality of lever arms (34) each having a first end portion (36) connected to the frame (12) by a respective pivotal bearing (42) and pivotally connected to a respective end portion of the axles (50), a second end portion (38) rotatably connected to a respective one of the wheels (18,20, 22,24) and an inner portion (38), each of said wheels (18,20,22,24) being driven through the respective inner portion (38) of the lever arm (34) by the axles (50) and speed differential (52); and
fluid control means (56) associated with each of the wheels (18,20,22,24) including a plurality of fluid cylinders (58) each having a first end portion (60) pivotally connected to the frame (12) and a second end portion (62) pivotally connected to a respective lever arm (34), said cylinders (58) being angularly oriented from the vertical whereby the ratio between the cylinder displacement and wheel displacement is proportionately reduced as the wheel is raised above the level vehicle position and increased as the wheel is lowered below the level vehicle position, said cylinders (58) attached to said left frame member (14) being in fluid communication with one another and said cylinders (58) attached to said right frame member being in fluid communication with one another, said fluid control means proportionately increasing the supporting force exerted on the frame by each wheel (18,20,22,24) in response to increasing downward movement of the wheel from a first location and proportionately decreasing the supporting force exerted on the frame by each wheel in response to increasing upward movement of the wheel from the first location, said frame (12) always moving elevationally less than one-half the height of an obstacle during movement of one of the wheels (18,20,22,24) over the obstacle.

2. A suspension system, as set forth in claim 1, including:
a pressurized fluid source (66);
first and second selector means (72,74) each connected to the fluid source (66) and to the two cylinders (58) on a respective side (14,16) of the vehicle (10) for selectively communicating pressurized fluid between said two cylinders (58) and said fluid source (66) and communicating fluid between said cylinders (58); and
first and second fluid blocking means (75,76) each connected between said selector means (72,74) and the two cylinders (58) on a respective side (14,16) of the vehicle (10) for blocking all fluid passages between said cylinders (58) and said fluid source (66) and between said cylinders (58).

3. A suspension system, as set forth in claim 1, including:
a reservoir (70); and
wherein the first and second selector means (72,74) each include a three-position valve (72,74) movable between a first position at which the fluid source (66) is blocked from communication with the respective two cylinders (58) and the reservoir (70), a second position at which the fluid source (66) is blocked from communication with the respective two cylinders (58) and the respective two cylinders (58) are in fluid communication with the reservoir (70), and a third position at which the fluid source (66) is in fluid communication with the two cylinders (58) and communication is blocked between the two cylinders (58) and the reservoir (70).

4. A suspension system, as set forth in claim 3, including:
first and second blocking means (75,82;76,84) each for maintaining fluid in and between respective cylinders (58) at all positions of the respective three-position valve (72,74).

5. A suspension system, as set forth in claim 1, including:
first and second accumulators (78,80) each connected in fluid communication with the two cylinders (58) of a respective side (14,16) of the frame (12); and
first and second valves (82,84) each connected between a respective accumulator (78,80) and said respective two cylinders (58).

* * * * *